United States Patent [19]

Mann

[11] Patent Number: 5,580,946
[45] Date of Patent: Dec. 3, 1996

[54] THERMOPLASTIC POLYURETHANE-EPOXY MIXTURES THAT DEVELOP CROSS-LINKING UPON MELT PROCESSING

[75] Inventor: William H. Mann, Hopkinton, N.H.

[73] Assignee: REFAC International, Ltd., New York, N.Y.

[21] Appl. No.: 452,986

[22] Filed: May 30, 1995

Related U.S. Application Data

[63] Continuation of Ser. No. 150,963, Nov. 12, 1993, abandoned.

[51] Int. Cl.⁶ .......................... C08G 18/28; C08L 75/04
[52] U.S. Cl. .......................... 528/73; 528/85; 525/453; 525/528
[58] Field of Search .................. 528/44, 69, 73, 528/85; 525/528, 453

[56] References Cited

U.S. PATENT DOCUMENTS

| | | | |
|---|---|---|---|
| 4,608,418 | 8/1986 | Czerwinski et al. | 528/44 |
| 4,870,142 | 9/1989 | Czerwinski et al. | 525/528 |

*Primary Examiner*—Nathan M. Nutter
*Assistant Examiner*—John M. Cooney, Jr.
*Attorney, Agent, or Firm*—Wyatt, Gerber, Burke & Badie, L.L.P.

[57] ABSTRACT

The compositions of the invention are hot melt urethane compositions for application in the molten star at temperatures of from about 121.1°–232.2° C. having viscosities of less than 50,000 cps which upon cooling form an elastomeric solid.

16 Claims, No Drawings

THERMOPLASTIC POLYURETHANE-EPOXY MIXTURES THAT DEVELOP CROSS-LINKING UPON MELT PROCESSING

This application is a continuation of prior application Ser. No. 08/150,963, filed Nov. 12, 1993, now abandoned.

BACKGROUND OF THE INVENTION

U.S. Pat. No. 4,608,418 to Czerwinski et al. teaches hot melt urethane compositions formed from a mixture of a long chain polyol, a chain extender, an isocyanate or isocyanate prepolymer, and a plasticizer. Optionally, various resins including epoxy resins also may be dissolved in the plasticizer and incorporated into the composition. A hot melt composition generally is one applied in the molten state, at temperatures of about 250° F. (121.1° C.) to 450° F. (232.2° C.), and having a viscosity in that condition (Brookfield viscometer) of less than about 50,000 cps, preferably less than about 25,000 cps. When cooled to room temperature, such compositions are solids that are elastomeric in nature. These compositions are formed by heating the reactants at temperatures of at least about 330° F. (165.6° C.), preferably at about 350° F. (176.7° C.) to about 450° F. (232.2° C.) for 2 or 3 hours.

U.S. Pat. No. 4,870,142 to Czerwinski et al. teaches thermoplastic hot melt compositions formed from a mixture of one or more polyisocyanates, one or more hydroxyl terminated polyols and/or one or more chain extenders, and one or more epoxy resins.

OBJECTS OF THE INVENTION

It is an object of the present invention to provide compositions that permit a time delayed curing. Another object is to provide compositions that permit a period of storage in the form of a shaped material which can then, with a subsequent activating step, be cross-linked. Still another object is to provide thermosetting compositions that can be processed and shaped in conventional plastic and/or rubber processing equipment. Another object is to provide compositions that can be melt processed and shaped in conventional plastic and/or rubber processing equipment and, after such melt processing, can be subjected to further processing as a thermoplastic. A further object is to provide 100% solids compositions that can be processed as thermoplastic materials in conventional plastic or rubber processing equipment such as, for instance, extruders, molding machines, compression machines, injection machines, two roll mills and the like, and whereby the resulting shaped material, i.e., film, sheet, profile, and the like, can, for a certain period of time, be subjected to additional shaping processing such as, for example, compression molding, vacuum forming, or some other shaping process. Yet another object of the present invention is to provide methods for preparing these compositions. These and other objects of the present invention will be apparent from the following description.

SUMMARY OF THE INVENTION

The compositions of the present invention are hot melt urethane compositions intended to be applied in the molten state, at temperatures of about 250°–450° F. (121.1°–232.2° C.), and having a viscosity (all viscosities herein are measured with a Brookfield viscometer) in that condition of less than about 50,000 cps, preferably less than about 25,000 cps, and most preferably about 10,000 cps. When cooled to room temperature, such compositions are solids that are elastomeric in nature. These compositions are formed by heating a mixture of one or more polyisocyanates, one or more hydroxyl terminated polyols, one or more chain extenders and one or more epoxy resins at temperatures of at least about 330° F. (165.6° C.), preferably at about 350° F. (176.7° C.) to about 450° F. (232.2° C.) for a period of several hours. The compositions are then blended or mixed with a material that contains an active group capable of reacting with an epoxy group. The resulting blend or mixture is processed in melt processing equipment and allowed to cross-link.

DETAILED DESCRIPTION

The first component of the urethane compositions of the present invention is a thermoplastic hot melt composition comprising a polyurethane having at least one epoxy resin reacted therein formed by heating a reaction mixture comprising at least one isocyanate having a functionality less than about 2.2, at least one hydroxyl terminated long chain polyol, at least one chain extender and at least one epoxy resin at a temperature of at least about 330° F. (165.6° C.), wherein said components are present in amounts that are within the values of the following formula:

$$\frac{A+B+C}{D} = 0.5 \text{ to about } 7.0$$

wherein A represents the equivalent weight of the long chain polyol×the moles thereof used; B represents the equivalent weight of the chain extender×the moles thereof used; C represents the equivalent weight of the isocyanate used; and D represents the grams of epoxy resin.

The urethane material of the first component is based on essentially stoichiometric amounts of a diisocyanate (which insures that a thermoplastic material results) having a functionality of 2.2 or less, preferably 2.15 or less and most preferably in the range of 2.0–2.1. If the functionality is in excess of, or with certain isocyanates close to 2.2, a thermosetting material, which is excluded from the first component, results. Preferably the NCO/OH ratio in the reaction system is about 0.95 to about 1.05 as at values substantially in excess of 1.05 the reaction product tends to be non-thermoplastic. Chain extending agents, compounds which carry at least two active hydrogen atoms per molecule and preferably have a molecular weight of from about 52 to below 500, most preferably from about 62 to about 250, are included in the reaction mixture. These compounds react with the isocyanate groups of the prepolymer to produce high molecular weight polyurethanes and polyurethane ureas by linking several isocyanate prepolymers. The polyisocyanate reactants useful in preparing the compositions of the present invention are aromatic, aliphatic, cycloaliphatic or aralkyl polyisocyanates containing from about 6 to 100 carbon atoms. Although the preferred isocyanate-containing reactants contain two isocyanate groups, reactants containing more than two such groups are operative so long as the average functionality does not exceed 2.2 and the resulting urethane is thermoplastic. Blends or mixtures also are included in the foregoing definition of polyisocyanate reactants. Isocyanate terminated prepolymers which perform as diisocyanates under the processing conditions of the present invention and have an average functionality of 2.2 or less also are useful and are considered equivalent to the preferred diisocyantes.

The following list names some polyisocyanates useful in the present invention but is not to be understood as excluding others not listed for sake of brevity:

4,4'-diphenylmethane diisocyanate (MDI); toluene-2,4-diisocyanate; 3-phenyl-2-ethylenediisocyanate; 1,3-naphthalene diisocyanate; 1,4-naphthalene diisocyanate; 1,5-naphthalene diisocyanate; cumene-2,4-diisocyanate; 4-methoxy-1,3-phenylene diisocyanate; 4-chloro-1,3-phenylene diisocyanate; 4-bromo-1,3-phenylene diisocyanate; 4-ethyloxy-1,3-phenylene diisocyanate; 2,4'-diisocyanato-diphenyl ether; 4,4'-diisocyanato-diphenyl ether; 2,4-dimethyl-1,3-phenylene diisocyanate; 5,6-dimethyl-1,3-phenylene diisocyanate; benzidene diisocyanate; 4,4'-diisocyanatodibenzyl; 4,6-dimethyl-1,3-phenylene diisocyanate; 1,4-anthracene diisocyanate; 9,10-anthracene diisocyanate; 3,3'-dimethyl-4,4'-diisocyanato-diphenylmethane; diisocyanatodiphenylmethane; 2,6-dimethyl-4,4'-diisocyanatodiphenyl; 2,4-diisocyanatostilbene; 3,3'-dimethyl-4,4'-diisocyanatodiphenyl; 3,3'-dimethoxy-4,4'-diisocyanatodiphenyl; 2,5-fluoroene diisocyanate; 1,3-phenylene diisocyanate; methylene-bis(4-phenylisocyanate); 2,6-diisocyanatobenzylfuran; bis(2-isocyanato-ethyl)fumarate; bis(2-isocyanato-ethyl)carbonate; bis(2-isocyanato-ethyl)-4-cyclohexene-1,2-dicarboxylate; 1,4-tetramethylene diisocyanate; 1,6-hexamethylene diisocyanate; 1,10-decamethylene diisocyanate; 1,3-cyclohexylene diisocyanate; 4,4'-methylene-bis(cyclohexyl diisocyanate; and tetramethylenexylene diisocyanate.

Isocyanate-terminated polyurethane prepolymers useful herein include blocked isocyanate prepolymers, such as, for example, a polyalkylene glycol or polyalkylene ether polyester, polyacetal, polyamide, polyester polyamide, or polythioether polyol, which can be reacted with an excess of a diisocyanate, such as those mentioned above, to form a suitable prepolymer with residual isocyanate groups. The prepolymers are formed in conventional manner and are generally produced by reaction materials such as mentioned above and diisocyanates at temperatures of from about 50° F. (10.0° C.) to about 130° F. (54.4° C.), the reaction time being matched to the predetermined temperature, for example two hours at about 120° F. (48.9° C.).

The substantially linear polyhydroxyl compounds with terminal hydroxyl groups include compounds of the formula HO—D—OH having a functionality of 2.2 or below wherein D is polyester, polyester amide, polyether, polyacetal, polycarbonate, or poly-N-alkylurethane. Other groups such as ester, ether, amide, urethane, or N-alkylurethane groups optionally may be present in D. The average molecular weight of the substantially linear polyhydroxyl compounds preferably from above 500 to 5000, most preferably from about 800 to about 3000. These compounds preferably have a melting point below 150° F., in particular below 110° F. It is also within the scope of the present invention to use mixtures of these compounds.

Useful compounds of formula HO—D—OH include polyesters of dibasic acids, for example adipic acid, and dialcohols, for example, ethylene glycol, propylene glycol, 1,4-butanediol; 2,5-hexanediol; 2,2-dimethyl-1,3-propanediol; 1,6-hexanediol; 2-ethyl-1,6-hexanediol; 2,2-dimethyl-1,3-hexanediol; p-bis-hydroxymethyl cyclohexane; 3-methyl-1,4-pentanediol; and 2,2-diethyl-1,3-propanediol. Mixtures of either the dibasic acid or the dialcohol, or both may be employed. It is preferred to use mixtures of diols, particularly diols containing 5 or more carbon atoms because polyesters of this kind show very high resistance to hydrolysis. When the diols contain branched alkyl radicals, the end products also show outstanding low temperature elasticity. Polyesters obtained by polymerizing caprolactones with glycols also can be used herein.

Chain extending agents, compounds which carry at least two active hydrogen atoms per molecule and preferably have a molecular weight of from about 52 to below 500, most preferably from about 62 to about 250, are included in the reaction mixture. These compounds react with the isocyanate groups of the prepolymer to produce high molecular weight polyurethanes and polyurethane ureas by linking several isocyanate prepolymers. Examples of useful chain extending agents are the following:

ethylene glycol; propane-1,2-diol; hexane-1,6-diol; 2-ethyl-1,6-hexanediol; dihydroxyethylurea; terephthalic acid-bis-(β-hydroxyethylamide); hydroquinone-bis-hydroxyethyl ether; naphthylene-1,5-bis-hydroxyethyl ether; 1,1-dimethyl-4-(bis-β-hydroxyethyl)-semicarbazide; succinic acid, adipic acid, isophthalic acid; 1,4-cyclohexane dicarboxylic acid; ethylene diamine; hexamethylene diamine; 1,4-cyclohexane diamine; hexahydro-$\underline{m}$-xylene diamine; $\underline{m}$-xylylene diamine; $\underline{p}$-xylylene diamine; bis(β-aminoethyl)-oxalamide; piperazine; 2,5-dimethyl piperazine; ethanolamine; 6-aminocaproic acid; 4,4-diaminodiphenylmethane; 4,4'-diaminodiphenyldimethylmethane; 2-amino acetic acid hydrazide; 4-aminobutyric acid hydrazide; 6-aminocaproic acid hydrazide; 2-hydroxyacetic acid hydrazide; 2-aminobutyric acid hydrazide; 6-hydroxycaproic acid hydrazide; carbodihydrazide; hydracrylic acid dihydrazide; adipic acid dihydrazide; isophthalic acid dihydrazide; $\underline{m}$-xylylene dicarboxylic acid dihydrazide; ethylene glycol-bis-carbazinic ester; butanediol-bis-semicarbazide and hexamethylene-bis-semicarbazide.

The epoxy resin must be capable of being reacted into the polyurethane at temperatures of about 330° F. (165.6° C.). The epoxy curing agent can be any material containing a group capable of reacting with an epoxy group. Preferred examples of such materials are amine-terminated thermoplastic polyamide resins based on dimer acids, for example, Macromelt 6071 and are commercially available from various manufacturers, for instance, Henkel Corporation and Union Camp Corporation. Epoxy resins having an epoxy equivalent weight of 190 have been used in the accompanying examples, although higher and lower equivalent weights also can be used in other embodiments of the present invention.

The compositions of U.S. Pat. No. 4,870,142 can be used as starting materials for use in the present invention.

The process for preparing the epoxy-containing component of the urethane compositions of the present invention is detailed in U.S. Pat. No. 4,870,142. Generally, at least one long chain polyol, at least one chain extender, at least one epoxy resin, and at least one isocyanate having a functionality less than about 2.2 are heated to reaction temperatures for a sufficient time to permit the reaction to reach substantial completion. A catalyst, for instance, dibutyl tin dilaurate, preferably is employed. All of the ingredients are present in amounts to meet the foregoing formula. The reaction is exothermic but, once the exothermic temperature maximum is reached, the mixture is heated to at least about 330° F. (165.6° C.), preferably to from about 365° F. (185.6° C.) to about 450° F. (232.2° C.), while maintaining constant agitation until the reaction is completed, typically several hours. Essentially stoichiometric amounts of a diisocyanate having a functionality of 2.2 or less are employed (which insures that a thermoplastic material results), preferably 2.15 or less and most preferably in the range of 2.0°–2.1. If the functionality is in excess of, or with certain isocyanates close to 2.2, a thermosetting material, which is excluded from the first component, results. Preferably the NCO/OH ratio in the reaction system is about 0.95 to about 1.05 as at values substantially in excess of 1.05 the reaction product tends to be non-thermoplastic.

In accordance with a preferred process of forming the first component of the compositions of the present invention, the ingredients thereof, except the polyisocyanate, are blended at the lowest possible temperature, preferably in a closed reaction vessel equipped with agitating means, after which the isocyanate is added. Preferably, the catalyst is added after the isocyanate. The system is permitted to exotherm and, after the peak exotherm has been reached, typically at about 200° F. (93.3° C.), the system is heated at from about 365° F. (185° C.) to about 390° F. (198.9° C.) for at least about two hours while agitating to complete the reaction.

Alternatively, in accordance with another preferred process, either the long chain linear polyol or the chain extender is blended with the epoxy resin. The polyol or chain extender, whichever is used, determines the backbone of the final chain extended copolymer and, as a consequence, the low temperature properties, chemical resistance and physical properties (flexibility) of the final chain extended copolymer. The polyisocyanate then is added slowly to either the long chain polyol or the chain extender in a manner to generate a homogeneous system. After the addition of the polyisocyanate is completed, a catalyst optionally may be added, and the batch is permitted to exotherm, e.g. to about 200° F. (93.3° C.). Either the long chain polyol or the chain extender, whichever was not added previously, then is added, preferably at a temperature lower than the final reaction temperature. The batch then is heated at from 365° F. (185° C.) to about 390° F. (198.9° C.) for at least about two hours while agitating to complete the reaction.

It is also possible, however, to simply blend all of the components, permit the blend to cure in situ, and then, prior to or during use, elevate the temperature to at least about 330° F. (165.6° C.). Heating time varies greatly depending upon the form of the composition. For example, assuming a substantially completely cured thin film or layer thereof (that is, one that has been permitted to cure in situ in place or in a container for a substantial period of time), results indicate that heating to at least about 330° F. (165.6° C.) for at least about two hours to form the resultant hot melt composition.

After the foregoing procedure is completed using any of the various methods described above, the reaction product is removed from the reaction vessel as a hot melt liquid having a melt point or softening point of 212° F. (100° C.), and poured into molds, trays, shapes or other desired receptacle, and cooled at lowered temperatures, for example, by use of liquid nitrogen. The cooled reaction product is then reduced in particle size by treating with a hammer, hammer mill, granulator or the like. While the chosen size will vary with the equipment used and the intended use, it has been found that a suitable size is less than 0.5 inch, and generally from about 0.1 inch (0.25 cm) to about 0.4 inch (1.0 cm), preferably from about 0.2 inch (0.5 cm) to about 0.3 inch (0.76 cm). Generally the particles are irregular in shape. If necessary the granulated particles can be treated with a dusting powder, for example, calcium carbonate, to avoid blocking conditions. The reaction product at this stage is an excellent hot melt adhesive in its own right and can be processed in standard hot melt equipment. It has a melt or softening point of about 212° F. (100° C.) and a viscosity of approximately 10,000 cps. In addition, it contains free epoxy groups available for reacting with epoxy curing agents.

The next step is to react the foregoing reaction product with an amount of an epoxy curing agent effective to cure the epoxy resin. Examples of suitable curing agents are, for example, an amine liberating thermoplastic, an amine, an acid, an anhydride, or a peroxide. A preferred epoxy curing agent is an amine-terminated thermoplastic polyamide resin, most preferably having an amine value of about 30 and a melt or softening point of about 212° F. (100° C.) and a viscosity of about 10,000 cps and which is itself a hot melt adhesive. The two ingredients are blended and processed in melt processing equipment, for example, an extruder, and then formed into any desired shape, such as rod, film or tubing, and the like, by being pressed, compression molded, die cut, or used to hot fill a cavity. The shaped blend is allowed to cross-link at room temperature or by using heat to accelerate curing. In this manner, the material has been processed initially as a thermoplastic, prior to addition of the epoxy curing agent, but then, after addition of the epoxy curing agent, optionally can be processed to impart a final shape, and additionally cross-linked to increase physical and mechanical properties, specifically higher tensile strength, greater hardness and higher temperature resistance. Even after oven testing, the shaped blend is flexible, rather than rigid as would be expected in a polyamide cured system.

It is also possible to add to the first reaction mixture a composition prepared according to U.S. Pat. No. 4,608,418 containing a long chain polyol, a chain extender, an isocyanate or prepolymer and a plasticizer, but no epoxy resin. In this manner, there is obtained a more flexible shaped blend although with decreased cross link density and temperature resistance, but still with a temperature resistance higher than any of the components.

While the first reaction product and the amine-terminated thermoplastic polyamide resin both melt at about 212° F. (100° C.), the shaped blend does not soften until much higher temperatures of from about 310° F. (154.4° C.) to about 325° F. (162.8° C.) are attained. Immediately upon cooling to around 300° F. (148.9° C.), however, tensile strength and holding power return.

The following examples illustrate the present invention without, however, limiting the same thereto.

EXAMPLE 1

| Ingredients | Grams |
| --- | --- |
| a) PCP 0240, polycaprolactone-1,4-butane-diol-diisocyanate, 1 equivalent | 1000 |
| b) 1,4-butanediol, 4 equivalents | 180 |
| c) XP 744 (Mobay), modified liquid methylene diisocyanate adduct of functionality 2.0 and equivalent weight of 190, 5 equivalents | 935 |
| d) Brominated 8043, equivalent weight epoxy of 190 | 1200 |

Ingredients a, b, and d are blended using a closed vessel reactor with agitator. When the mixture is uniformly blended, ingredient c is added slowly with agitation. After all of ingredient c has been added, 20 drops of catalyst, dibutyl tin dilaurate, are added. The reaction is exothermic, heating the reaction mass to about 200° F. (93.3° C.). Once the exothermic temperature maximum is reached, the mixture is heated to from about 365° F. (185.6° C.) to about 390° F. (198.9° C.) for about 2.5 hours maintaining constant agitation to complete the reaction.

The reaction product is removed from the reaction vessel as a hot melt liquid, having a melt point or softening point of 212° F. (100° C.), and poured into molds. It is then cooled with liquid nitrogen and reduced to a particle size suitable for use in the intended product-forming process, in this case to a size of about 0.25 inch (0.64 cm). The reaction product at this stage is an excellent adhesive in its own right, containing free hydroxy groups available for reacting with curing agents. It has a melting point of about 212° F. (100° C.) and a viscosity of approximately 10,000 cps.

Equal parts of the foregoing reaction product and an amine-terminated thermoplastic polyamide resin having about the same particle size, an amine value of approximately 30, and a melt point or softening point of 212° F. (100° C.), are dry blended. The blend is then processed in an extruder, at a general temperature profile of 200° F. (93.3° C.), all zones maximum temperature, and extruded to yield a low viscosity, smooth extrudate. The extrudate is applied directly from the extruder to automotive parts for under the hood continuous use applications and heat sealed at 325° F. (162.8° C.) under pressure for a few seconds. The adhesive provides increased tensile and temperature performance. No softening of the adhesive is seen until the temperature reaches a temperature of from about 310° F. (154.4° C.) to about 325° F. (162.8° C.). The physical properties return upon cooling to about 300° F.

EXAMPLE 2

| Ingredients | Grams |
| --- | --- |
| a) PCP 0240, polycaprolactone-1,4-butane-diol-diisocyanate, 1 equivalent | 1000 |
| b) 1,4-butanediol, 4 equivalents | 180 |
| c) XP 744 (Mobay), modified liquid methylene diisocyanate adduct of functionality 2.0 and equivalent weight of 187, 5 equivalents | 935 |
| d) Brominated 8043, brominated epoxy resin | 1200 |

Ingredients a and d are blended in a closed vessel reactor equipped with agitating means. When the mixture is uniformly blended, ingredient c is added slowly with agitation. After all of ingredient c has been added, ingredient b is added with agitation. Twenty drops of catalyst, dibutyl tin dilaurate, are added. The reaction is exothermic, heating the reaction mass to about 200° F. (93.3° C.). Once the exothermic temperature maximum is reached, the mixture is heated to from about 365° F. (185.6° C.) to about 390° F. (198.9° C.) for about 2.5 hours maintaining constant agitation to complete the reaction.

The reaction product is removed from the reaction vessel as a hot melt liquid, having a melt point or softening point of 212° F. (100° C.) and poured into molds. It is then cooled with liquid nitrogen and reduced to a particle size suitable for use in the intended product-forming process, in this case to a size of about 0.3 inch (0.76 cm). The reaction product at this stage is an excellent adhesive in its own right, containing free hydroxy groups available for reacting with curing agents. It has a melting point of about 212° F. (100° C.) and a viscosity of approximately 10,000 cps.

Equal parts of the foregoing reaction product and an amine-terminated thermoplastic polyamide resin having about the same particle size, an amine value of approximately 30, and a melt point or softening point of 212° F. (100° C.) are dry blended. The blend is then extruded. The extrudate is then compression molded to form desired articles.

EXAMPLE 3

| Ingredients | Grams |
| --- | --- |
| a) PCP 0240, polycaprolactone-1,4-butane-diol-diisocyanate, 1 equivalent | 1000 |
| b) 1,4-butanediol, 4 equivalents | 180 |

-continued

| Ingredients | Grams |
| --- | --- |
| c) XP 744 (Mobay), modified liquid methylene diisocyanate adduct of functionality 2.0 and equivalent weight of 187, 5 equivalents | 935 |
| d) Brominated 8043, equivalent weight epoxy of 190 | 1200 |

Ingredients b and d are blended using a closed reactor with an agitator. When the mixture is uniformly blended, ingredient c is added slowly with agitation. After all of ingredient c has been added, ingredient a is added with agitation after which 20 drops of catalyst, dibutyl tin dilaurate, are added. The reaction is exothermic, heating the reaction mass to about 200° F. (93.3° C.). Once the exothermic temperature maximum is reached, the mixture is heated to from about 365° F. (185.6° C.) to about 390° F. (198.9° C.) for about 2.5 hours maintaining constant agitation to complete the reaction.

The reaction product is removed from the reaction vessel as a hot melt liquid, having a melt point or softening point of 212° F. (100° C.), and poured into molds. It is then cooled with liquid nitrogen and reduced to a particle size suitable for use in the intended product-forming process, in this case to a size of about 0.2 inch (0.5 cm). The reaction product at this stage is an excellent adhesive in its own right, containing free hydroxy groups available for reacting with curing agents. It has a melting point of about 212° F. (100° C.) and a viscosity of approximately 10,000 cps.

Equal parts of the foregoing reaction product and an amine-terminated thermoplastic polyamide resin having about the same particle size, an amine value of approximately 30, and a melt point or softening point of 212° F. (100° C.), are dry blended. The blend is then processed in an extruder, at a general temperature profile of 200° F. (93.3° C.), all zones maximum temperature, and extruded to yield a low viscosity, smooth extrudate. The extrudate is then die cut to form desired shapes.

What is claimed is:

1. A method of making a thermoplastic polyurethane composition useful as a time delayed curing hot melt adhesive comprising:

(a) reacting (i) a blend of an epoxy resin with at least one of (1) a substantially linear polyhydroxyl compound of the formula HO—D—OH having a molecular weight above 500 and a functionality of 2.2 or below wherein D is polyester, polyester amide, polyether, polyacetal, polycarbonate, or poly-n-alkylurethane and (2) a chain extender compound having at least two active hydrogen atoms per molecule and a molecular weight below 500, and (ii) a polyisocyanate, (b) heating the resulting reaction mixture, (c) adding any ingredient (1) or (2) not added in step (a), followed by heating, (d) forming the reaction mixture into particles of reduced size of less than 0.5 inch, (e) blending the reaction mixture with an amine liberating thermoplastic; and;

(f) coextruding the reaction mixture with said solventless amine liberating thermoplastic.

2. The method according to claim 1 wherein in step (a) the epoxy resin is blended with both the substantially linear polyhydroxyl compound and the chain extender compound.

3. The method according to claim 1 wherein all of the ingredients are added in step (a).

4. The method according to claim 1 wherein after all ingredients have been added, the reaction mixture is heated at from about 365° F. to about 390° F. for at least about 2 hours.

5. The method according to claim 1 wherein the blending in step (a) is effected at the lowest possible temperature.

6. The method according to claim 1 wherein the mixture is allowed to reach its maximum exotherm before heating is initiated in step (c).

7. The method according to claim 1 wherein the NCO/OH ratio in the reaction system is about 0.95 to about 1.05.

8. A time-delayed curing thermoplastic hot melt composition comprising a blend of:
(a) at least one isocyanate having a functionality less than about 2.2, at least one hydroxyl terminated long chain polyol, at least one chain extender, and at least one epoxy resin, wherein said components are present in amounts that are within the values of the following formula:

$$\frac{A+B+C}{D} = 0.5 \text{ to about } 7.0$$

wherein A represents the equivalent weight of the long chain polyolol times the moles thereof used; B represents the equivalent weight of the chain extender times the moles thereof used; C represents the equivalent weight of the isocyanate times the moles thereof used; and D represents the grams of epoxy resin, said composition having a particle size of less than 0.5 inch, and;
(b) an amine liberating thermoplastic.

9. The composition of claim 8 wherein the amine liberating thermoplastic is an amine-terminated thermoplastic polyamide resin.

10. The composition of claim 9 wherein the amine-terminated thermoplastic polyamide resin has an amine value of about 30.

11. The composition of claim 9 wherein the amine-terminated thermoplastic polyamide resin has a melt or softening point of about 212° F. (100° C.).

12. The method of claim 3 wherein the reaction mixture is heated to at least about 330° F. for at least about 2 hours.

13. The method according to claim 1, said step (e) occurring in the absence of solvent.

14. The composition of claim 8, said composition having a melting point of not less than 310° F.

15. The composition of claim 8, said blend being coextruded.

16. A thermoplastic polyurethane composition useful as a time-delayed curing hot melt adhesive, said composition made by the method of:
(a) reacting (i) a blend of an epoxy resin with at least one of (1) a substantially linear polyhydroxyl compound of the formula HO—D—OH having a molecular weight above 500 and a functionality of 2.2 or below wherein D is a polyester, polyester amide, polyether, polyacetal, polycarbonate, or poly-n-alkylurethane and (2) a chain extender compound having at least two active hydrogen atoms per molecule and a molecular weight below 500, and (ii) a polyisocyanate,
(b) heating the resulting reaction mixture,
(c) adding any ingredient (1) or (2) not added in step (a), followed by heating,
(d) forming the reaction mixture into particles of reduced size of less than 0.5 inch,
(e) blending the reaction mixture with an amine liberating thermoplastic, and;
(f) coextruding the reaction mixture with said amine liberating thermoplastic.

* * * * *